US010118098B2

(12) United States Patent
Kumagai et al.

(10) Patent No.: US 10,118,098 B2
(45) Date of Patent: Nov. 6, 2018

(54) PROGRAM PRODUCT AND SYSTEM

(71) Applicant: SQUARE ENIX CO., LTD., Tokyo (JP)

(72) Inventors: Takahiro Kumagai, Tokyo (JP); Takunori Arahari, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 10 days.

(21) Appl. No.: 15/363,448

(22) Filed: Nov. 29, 2016

(65) Prior Publication Data

US 2017/0151503 A1    Jun. 1, 2017

(30) Foreign Application Priority Data

Dec. 1, 2015 (JP) ................................ 2015-234699

(51) Int. Cl.
*A63F 13/5375* (2014.01)
*A63F 13/525* (2014.01)
(Continued)

(52) U.S. Cl.
CPC .......... *A63F 13/525* (2014.09); *A63F 13/533* (2014.09); *A63F 13/5375* (2014.09);
(Continued)

(58) Field of Classification Search
None
See application file for complete search history.

(56) References Cited

U.S. PATENT DOCUMENTS

| 8,210,943 B1 * | 7/2012 | Woodard ................ A63F 13/10 463/1 |
| 2001/0029203 A1 * | 10/2001 | Shoji ....................... A63F 13/04 463/33 |

(Continued)

FOREIGN PATENT DOCUMENTS

| JP | 2003-290550 | 10/2003 |
| JP | 2009-226081 | 10/2009 |

(Continued)

OTHER PUBLICATIONS

Office Action from Japan Patent Office (JPO) in Japanese Patent Appl. No. 2015-234699, dated Aug. 29, 2017, together with a partial English language translation.

(Continued)

*Primary Examiner* — Tramar Harper
(74) *Attorney, Agent, or Firm* — Greenblum & Bernstein, P.L.C.

(57) ABSTRACT

A non-transitory computer-readable medium including a program product for causing a user terminal to realize functions to control progress of a video game that proceeds in a three-dimensional virtual space in which a virtual camera is arranged is provided. The functions include to: generate first output information on the basis of information obtained by the virtual camera; generate second output information regarding a selection object configured to be able to be selected and indicating a target object being a target of an action; generate arrangement information regarding arrangement of the selection object indicating a hidden object which is the target object existing within an angle of view of the virtual camera and not displayed on an output device; and output a game image containing the selection object to the output device on the basis of the first
(Continued)

output information, the second output information, and the arrangement information.

14 Claims, 12 Drawing Sheets

(51) Int. Cl.
    *A63F 13/5378*     (2014.01)
    *A63F 13/533*     (2014.01)
    *A63F 13/35*     (2014.01)
    *A63F 13/837*     (2014.01)

(52) U.S. Cl.
    CPC .......... *A63F 13/5378* (2014.09); *A63F 13/35* (2014.09); *A63F 13/837* (2014.09)

(56) References Cited

U.S. PATENT DOCUMENTS

| | | | | |
|---|---|---|---|---|
| 2001/0049300 A1* | 12/2001 | Okamoto | ................ | A63F 13/10 463/30 |
| 2002/0034979 A1* | 3/2002 | Yamamoto | .............. | A63F 13/10 463/31 |
| 2003/0166413 A1* | 9/2003 | Hayashida | ............ | A63F 13/005 463/30 |
| 2003/0216177 A1* | 11/2003 | Aonuma | ................ | A63F 13/10 463/32 |
| 2005/0176502 A1* | 8/2005 | Nishimura | .............. | A63F 13/10 463/31 |
| 2005/0187015 A1* | 8/2005 | Suzuki | .................... | A63F 13/10 463/32 |
| 2006/0073899 A1* | 4/2006 | Kasamatsu | ............ | A63F 13/00 463/43 |
| 2006/0084509 A1* | 4/2006 | Novak | .................... | A63F 13/12 463/49 |
| 2006/0246968 A1* | 11/2006 | Dyke-Wells | ............ | A63F 13/10 463/1 |
| 2007/0270215 A1* | 11/2007 | Miyamoto | .............. | A63F 13/10 463/32 |
| 2008/0039164 A1* | 2/2008 | Shimada | ................. | A63F 9/143 463/6 |
| 2008/0188302 A1* | 8/2008 | Haga | ....................... | A63F 13/10 463/31 |
| 2009/0241038 A1 | 9/2009 | Izuno et al. | | |
| 2009/0325660 A1* | 12/2009 | Langridge | ............... | A63F 13/10 463/2 |
| 2011/0244957 A1* | 10/2011 | Nishimura | .......... | A63F 13/5258 463/31 |
| 2012/0052959 A1* | 3/2012 | Nishida | ................. | A63F 13/525 463/47 |
| 2012/0165095 A1* | 6/2012 | Sato | .................... | A63F 13/5252 463/31 |
| 2015/0157940 A1* | 6/2015 | Hall | .................... | A63F 13/2145 463/31 |

FOREIGN PATENT DOCUMENTS

| | | |
|---|---|---|
| JP | 2011-018147 | 1/2011 |
| JP | 2012-135337 | 7/2012 |
| JP | 2014-131754 | 7/2014 |
| JP | 2015-029918 | 2/2015 |
| JP | 2015-112394 | 6/2015 |

OTHER PUBLICATIONS

Office Action from Japan Patent Office (JPO) in Japanese Patent Appl. No. 2015-234699, dated Jan. 10, 2017, together with a partial English language translation.

* cited by examiner

PROGRAM PRODUCT AND SYSTEM

CROSS-REFERENCE TO RELATED APPLICATION

The present application relates to subject matter contained in Japanese Patent Application No. 2015-234699 field on Dec. 1, 2015, the disclosure of which is expressly incorporated herein by reference in its entirety.

BACKGROUND OF THE INVENTION

1. Field of the Invention

At least one of embodiments according to the present invention relates to a non-transitory computer-readable medium including a program product and a system for causing a user terminal to realize functions to control progress of a video game that proceed in a three-dimensional virtual space, in which a virtual camera is arranged.

2. Description of the Related Art

Heretofore, there has been a technique to control progress of a video game in a virtual space in which a virtual camera is arranged.

For example, there is one in which a game system displays a graphical user interface (hereinafter, referred to as a "GUI") for indicating an object that is included in a range of a field of view of a virtual camera (see Japanese Patent Application Publication No. 2012-135337).

However, in such a game system, there has been a problem that a user can grasp an object, which can be visually recognized by a GUI, being positioned in the line of sight, but cannot operate the object. Namely, it has been required to design a higher convenient GUI.

SUMMARY OF THE INVENTION

It is an object of at least one of embodiments according to the present invention to solve the problem described above, and to provide a high convenient GUI in a video game that proceeds in a three-dimensional virtual space.

According to one non-limiting aspect of the present invention, there is provided a non-transitory computer-readable medium including a video game processing program product for causing a user terminal to realize functions to control progress of a video game, the video game proceeding in a three-dimensional virtual space, a virtual camera being arranged in the three-dimensional virtual space.

The functions include a first generating function configured to generate first output information on the basis of information obtained by the virtual camera.

The functions also include a second generating function configured to generate second output information regarding a selection object, the selection object indicating a target object, the selection object being configured to be able to be selected, the target object being a target of an action when the video game proceeds.

The functions also include a third generating function configured to generate arrangement information regarding arrangement of the selection object indicating a hidden object on the basis of a position of the virtual camera and a position of the hidden object, the hidden object being the target object existing within an angle of view of the virtual camera and not displayed on an output device.

The functions also include an outputting function configured to output a game image to the output device on the basis of the first output information, the second output information, and the arrangement information, the game image containing the selection object.

According to another non-limiting aspect of the present invention, there is provided a system for controlling progress of a video game, the system including a communication network, a server, and a user terminal, the video game proceeding in a three-dimensional virtual space, a virtual camera being arranged in the three-dimensional virtual space.

The system includes a first generating section configured to generate first output information on the basis of information obtained by the virtual camera.

The system also includes a second generating section configured to generate second output information regarding a selection object, the selection object indicating a target object, the selection object being configured to be able to be selected, the target object being a target of an action when the video game proceeds.

The system also includes a third generating section configured to generate arrangement information regarding arrangement of the selection object indicating a hidden object on the basis of a position of the virtual camera and a position of the hidden object, the hidden object being the target object existing within an angle of view of the virtual camera and not displayed on an output device of the user terminal.

The system also includes a transmitting section configured to transmit output information for outputting a game image on the basis of the first output information, the second output information, and the arrangement information, the game image containing the selection object.

The system also includes an outputting section configured to output the game image to the output device on the basis of the output information.

According to still another non-limiting aspect of the present invention, there is provided a non-transitory computer-readable medium including a program product for causing a user terminal to realize functions to control progress of a video game, the video game proceeding in a three-dimensional virtual space, a virtual camera being arranged in the three-dimensional virtual space.

A server includes a first generating function configured to generate first output information on the basis of information obtained by the virtual camera.

The server also includes a second generating function configured to generate second output information regarding a selection object, the selection object indicating a target object, the selection object being configured to be able to be selected, the target object being a target of an action when the video game proceeds.

The server also includes a third generating function configured to generate arrangement information regarding arrangement of the selection object indicating a hidden object on the basis of a position of the virtual camera and a position of the hidden object, the hidden object being the target object existing within an angle of view of the virtual camera and not displayed on a display screen of a output device of the user terminal.

The server also includes a transmitting function configured to transmit, to the user terminal, information for causing the output device to output a game image on the basis of the first output information, the second output information, and the arrangement information, the game image containing the selection object.

The functions include a receiving function configured to receive, from the server, information for outputting the game image on the display screen of the output device of the user terminal.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

(First Embodiment)

Figure 1:
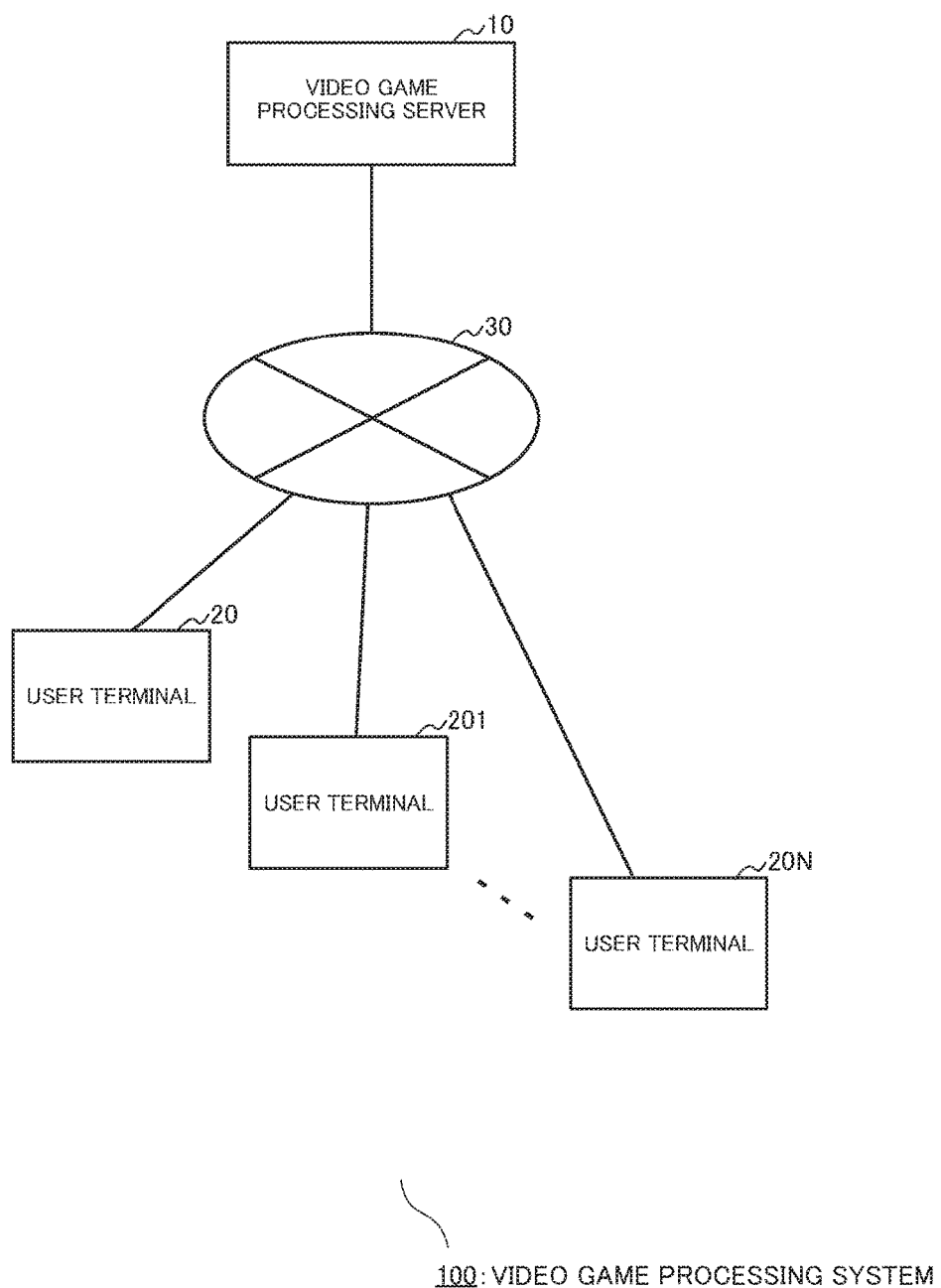
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10, and user terminals 20 and 201 to 20N ("N" is an arbitrary integer) respectively used by a plurality of users (players) who play a video game. In this regard, the configuration of the video game processing system 100 is not limited to this configuration. The video game processing system 100 may be configured so that the plurality of users uses a single user terminal, or may be configured so as to include a plurality of servers.

Each of the video game processing server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the video game processing server 10 and the plurality of user terminals 20, 201 to 20N, whereby various kinds of functions for controlling progress of the video game in response to an operation of the user are realized.

The video game processing server 10 is managed by an administrator of the video game processing system 100, and has various kinds of functions to provide information regarding the video game to the plurality of user terminals 20, 201 to 20N. In the present embodiment, the video game processing server 10 is constructed by an information processing apparatus, such as a WWW server, and includes a storage medium for storing various kinds of information. In this regard, the video game processing server 10 is provided with a general configuration for carrying out the video game, such as a control section and a communicating section. However, its explanation herein is omitted. Further, in the video game processing system 100, it is preferable that the video game processing server 10 manages information regarding the video game from a point of view to reduce a processing load on each of the plurality of user terminals 20, 201 to 20N. However, the storage section for storing the various kinds of information may include a storage region with a state that the video game processing server 10 can access the storage region. For example, the video game processing server 10 may be configured so as to be provided with a dedicated storage region outside the video game processing server 10.

A video game processing server 10 (hereinafter, referred to as a "server 10"), which is an example of the configuration of the video game processing server 10, at least includes a control section, a receiving section, and a transmitting section.

The control section has a function to control progress of the video game that proceeds in the three-dimensional virtual space on the basis of information received by the receiving section.

Here, a predetermined game field is constructed within the three-dimensional virtual space. An object representing a virtual object in the three-dimensional virtual space is arranged on the game field. In the video game according to the present embodiment, a plurality of character objects among the objects is divided into an enemy and a friend to carry out a fight. Here, the game field has a predetermined region. In the game field, a field object of objects, such as a virtual building in the three-dimensional virtual space and a virtual ground in the three-dimensional virtual space, is arranged. As one example of a plurality of field objects, there is a target object that becomes a target of an action when the video game proceeds.

Here, the character objects include a player character object that can express a state to operate in accordance with an operation of the user, an AI character object that can express a state to operate with an AI (Artificial Intelligence) without a direct operation by the user, and the like. As an example of the character object, there is a so-called avatar.

The target object is one kind of the field objects, and is an object that becomes a target of an action of the character object when the video game proceeds. As one example of the target object, there are an object of a facility required to be occupied in order to proceed advantageous in the video game, an object of a facility that becomes an attack target of the character object, and the like. At least one target object is arranged within the three-dimensional virtual space.

In this regard, an image corresponding to each of various kinds of objects is displayed on a display screen by processing (will be described later). For that reason, the various kinds of objects according to the present embodiment contain model data on the three-dimensional virtual space, and corresponding images to be displayed on the display screen.

The receiving section has a function to receive various kinds of information from each of the user terminals 20, 201 to 20N. The received information may be stored in a memory or a storing section (not shown in the drawings particularly).

The transmitting section has a function to transmit various kinds of information to each of the user terminals 20, 201 to 20N.

Each of the plurality of user terminals 20, 201 to 20N is managed by a user (or a player) who plays the video game, and is configured by a communication terminal, such as a cellular phone terminal, a PDA (Personal Digital Assistants), and a mobile game device, by which the user can play a network delivery type game, for example. In this regard, the configuration of the user terminal that the video game processing system 100 can include is not limited to the examples described above. However, the user terminal may be configured so that the user can recognize the video game. As the other example of the configuration of the user terminal, there is a so-called wearable divide such as a smart watch, a combination of the wearable device and the communication terminal, and the like.

Further, each of the plurality of the user terminals 20, 201 to 20N is connected to the communication network 30, and includes hardware (for example, the communicating section for carrying out communication with the server 10, a display device (or an output device) for displaying a game image, an input device for receiving an input from the user, an audio output device for outputting an audio (or a voice), and the like) and software for carrying out the video game by carrying out communication with the server 10 (although they are not shown particularly). In this regard, each of the plurality of the user terminals 20, 201 to 20N may be configured so as to be capable of directly communicating with each other without the video game processing server 10.

Figure 2:
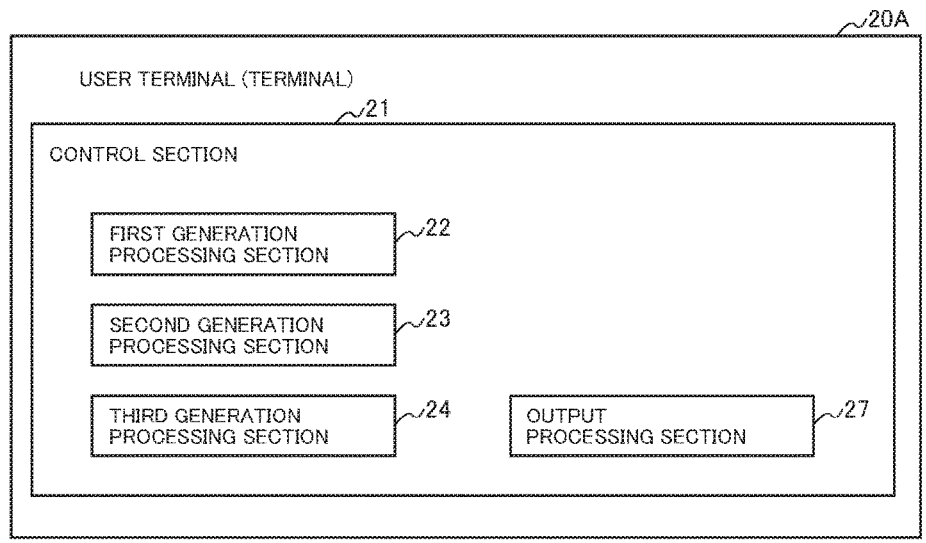
FIG. 2 is a block diagram showing a configuration of a user terminal corresponding to at least one of the embodiments according to the present invention.

FIG. 2 is a block diagram showing a configuration of the user terminal 20A, which is an example of the configuration of the user terminal 20. In this regard, each of the user terminals 201 to 20N may have the similar configuration to that of the user terminal 20A, or may be configured so as to have a different configuration therefrom. As shown in FIG. 2, the user terminal 20A at least includes a control section 21.

The control section 21 has a function to integrally control various kinds of configurations in the user terminal 20A by executing a program stored in a storage element such as a RAM and a flash memory, for example. As shown in FIG. 2, the control section 21 at least includes a first generation processing section 22, a second generation processing section 23, a third generation processing section 24, and an output processing section 27.

The first generation processing section 22 has a function to generate first output information.

Here, the first output information denotes information generated on the basis of information obtained by a virtual camera. One example of the information obtained by the virtual camera, there is information regarding an image captured by the virtual camera.

Here, the virtual camera is arranged in the three-dimensional virtual space. The virtual camera has parameters. The parameters include a position of the virtual camera in a coordinate system of the three-dimensional space, a direction of a visual axis and the angle of view of the virtual camera.

The second generation processing section 23 has a function to generate second output information.

Here, the second output information denotes a target object that is an object becoming a target of an action when the video game proceeds, and is information regarding an object configured to be selected (or selectable) (hereinafter, referred to as a "selection object"). One example of the information regarding the selection object is information regarding a form of the selection object.

Here, the "object configured to be selected" means an object that becomes a target, which can be selected by the user by means of a click, a tap, or the like against the display screen. In this point, the selection object is different from the target object. Further, the selection object has a correspondence relationship to one target object, and is constructed by a predetermined form. For example, the selection object is constructed by a display form such as a sign, a mark, an icon, a hologram and the like. It is preferable that in a case where the selection object is selected on the display screen, it is treated that a target object having a correspondence relationship to the selected selection object is selected.

The third generation processing section 24 has a function to generate arrangement information.

Here, the arrangement information is information regarding arrangement of the selection object, which indicates an object that is not displayed on the output device (hereinafter, referred to as a "hidden (non-display) object") of target objects existing within an angle of view of the virtual camera. Then, the arrangement information is generated on the basis of a position of the virtual camera and a position of the hidden object. As one example of the arrangement information, there is positional information in the generated game image on the basis of the first output information.

In this regard, the arrangement information may be information regarding arrangement of the selection object. As one example of other arrangement information, there are coordinate information in a coordinate system for the three-dimensional virtual space, coordinate information in a rectangular coordinate system of a game image that the display device is caused to display, and the like.

Here, the phrase "is not displayed to the output device" means not to be displayed on the display screen in which the game image is displayed. More specifically, a "target object that exists within the angle of view of the virtual camera, but is positioned at a spot that becomes shade of other object and cannot be visually recognized from the virtual camera" is not displayed on the output device. Namely, in a case where other object exist on a line of connecting the virtual camera and the target object (that is, an object that becomes a drawing target) and at a closer position than the target object when viewed from the virtual camera, the target object may be drawn in the game image. What the user must note at this time is that since the target object has a fixed volume, countless lines connecting the virtual camera and the target object can be defined and a similar evaluation is made on each of the countless lines. As a result, a situation that only a part of the target object can be seen may be generated. In the present embodiment, the target object is also treated as a hidden object in this case. However, the system 100 may be configured so that whether a target object a part of which can be seen is treated as a hidden object or not can be set up appropriately.

In this regard, the terminal 20A may be configured so that the hidden object includes a "target object that exists within the angle of view of the virtual camera but exists at a position outside a range of a visual volume of the virtual camera (that is, it exists at a position in front of a near clip plane, or exists at a position at the rear of a far clip plane)".

The output processing section 27 has a function to output a game image containing a selection object to the output device. In particular, the output processing section 27 has a function to generate the game image containing the selection object on the basis of the first output information, the second output information, and the arrangement information. As one example of the game image, there is an image in which the selection object corresponding to the hidden object is displayed so as to be visually recognized.

Here, the game image is displayed on the display screen of the user terminal 20A, and represents a progress status of the video game in response to an operation of the user.

Figure 3:
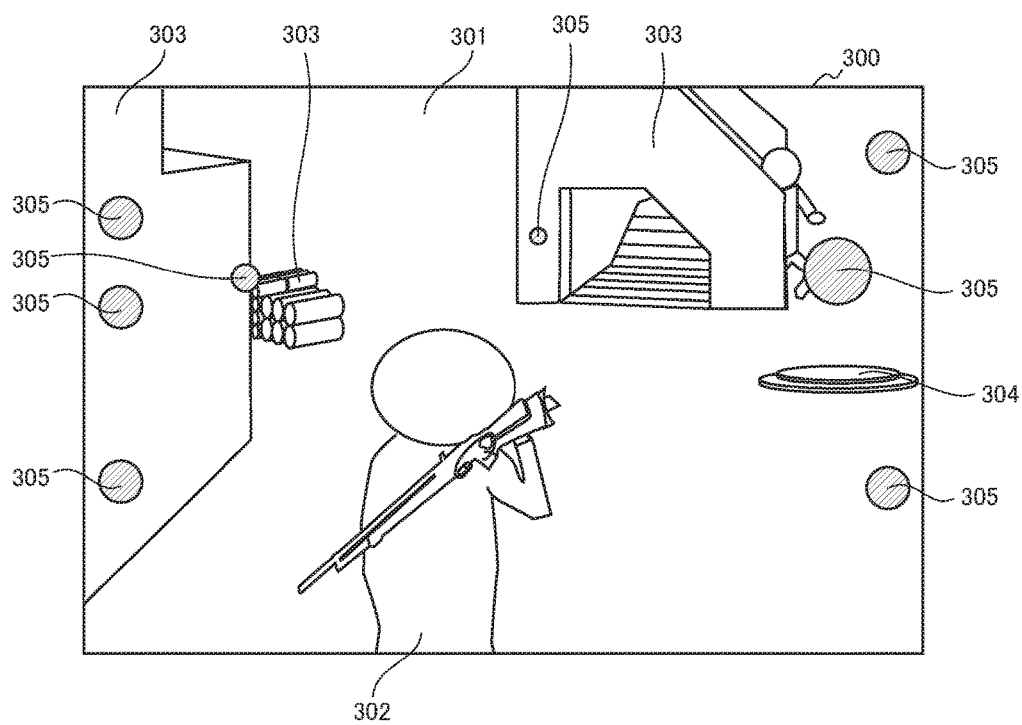
FIG. 3 is an explanatory drawing for explaining an example of a display screen corresponding to at least one of the embodiments according to the present invention.

FIG. 3 is an explanatory drawing for explaining an example of a display screen corresponding to at least one of the embodiments according to the present invention. As shown in FIG. 3, a game image 301 displayed on a display screen 300 contains a player character object 302 displayed on the basis of the first output information. Further, the game image 301 containp a plurality of field objects 303 displayed on the basis of the first output information. The field objects 303 contains a target object 304. Further, the game image 301 contains a plurality of selection objects 305 displayed on the basis of the second output information and the arrangement information.

Next, an operation of a video game processing system 100 (hereinafter, referred to as a "system 100") according to the present embodiment will be described.

Figure 4:
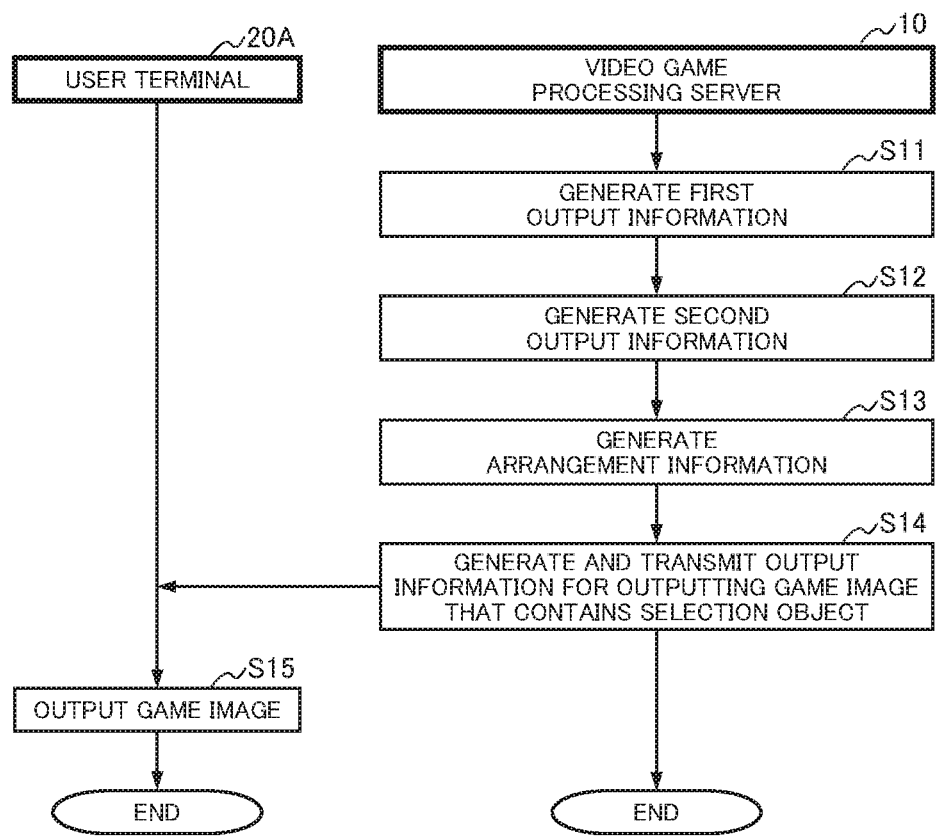
FIG. 4 is a flowchart showing an example of game processing corresponding to at least one of the embodiments according to the present invention.

FIG. 4 is a flowchart showing an example of game processing carried out by the system 100. In the game processing according to the present embodiment, processing to control progress of the video game that proceeds in the three-dimensional virtual space in which the virtual camera is arranged is carried out in response to an operation of the user. Hereinafter, the case where the server 10 and the user terminal 20A (hereinafter, referred to as a "terminal 20A") carry out the game processing as processing related to the video game will be described as an example. In this regard, the case where the control section of the server 10 includes the similar functions to those of the first generation processing section 22, the second generation processing section 23, and the third generation processing section 24 will be described.

In this regard, hereinafter, any of "the terminal 20A" and "other terminal" may be used properly as a terminal operated by a user who participates in a fighting game according to the game processing. The "other terminal" herein denotes a terminal other than the terminal 20A among terminals operated by users who participate in the fighting game according to the game processing. Here, the case where other terminal includes the similar configuration to that of the terminal 20A will be described.

The game processing according to the present embodiment is started in a case where the fighting game is started, and is continuously carried out at predetermined intervals. By continuously displaying an image generated in the game processing at a predetermined frame rate, an action of the object is expressed.

The game processing is started in accordance with start of the fighting game carried out in the three-dimensional virtual space, for example. Hereinafter, the case where a game image is outputted in the terminal 20A will be described as an example.

Further, in the example of the game processing, the case where information regarding a progress status of the video game is obtained in advance will be described as an example. Here, the information regarding the progress status of the video game contains information regarding an action instruction inputted by the user of each terminal (hereinafter, referred to as "action instruction information"). Further, the terminal 20A may be configured so that the information regarding the progress status of the video game contains information when the video game proceeds on the basis of the action instruction information.

The server 10 first generates first output information on the basis of information regarding progress of the video game (Step S11).

When the first output information is generated, the server 10 generates second output information (Step S12).

When the second output information is generated, the server 10 generates arrangement information (Step S13).

When the arrangement information is generated, the server 10 generates output information for outputting a game image, which contains a selection object, on the basis of the first output information, the second output information, and the arrangement information, and transmits the output information to the terminal 20A (Step S14).

The terminal 20A receives the output information thus transmitted, and outputs the game image containing the selection object to the output device included therein on the basis of the output information (Step S15). When the terminal 20A outputs the game image, the system 100 terminates the game processing.

Figure 5:
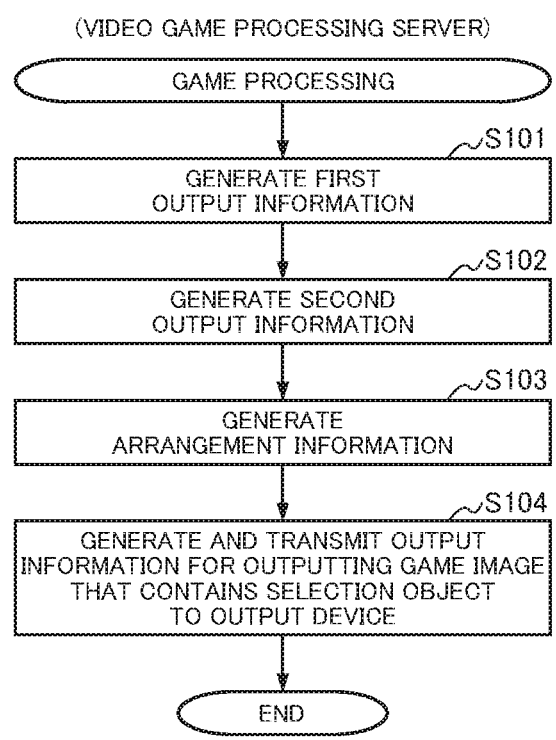
FIG. 5 is a flowchart showing an example of an operation of a server side in game processing corresponding to at least one of embodiments according to the present invention.

FIG. 5 is a flowchart showing an example of an operation of the server 10 in the game processing. Hereinafter, the case where the server 10 carries out the game processing by a single body will be described as an example. In this regard, the case where the control section of the server 10 includes the similar functions to the first generation processing section 22, the second generation processing section 23, and the third generation processing section 24 will be described. For this reason, its explanation is omitted from a point of view to avoid repeated explanation.

The server 10 first generates first output information on the basis of information regarding progress of the video game (Step S101). When the first output information is generated, the server 10 generates second output information (Step S102). When the second output information is generated, the server 10 generates arrangement information (Step S103). When the arrangement information is generated, the server 10 generates output information for outputting a game image, which contains a selection object, on the basis of the first output information, the second output information, and the arrangement information, and transmits the output information to each of the terminal 20A and other terminal (Step S104). When the output information is transmitted to each of the terminal 20A and other terminal, the server 10 terminates the game processing.

Figure 6:
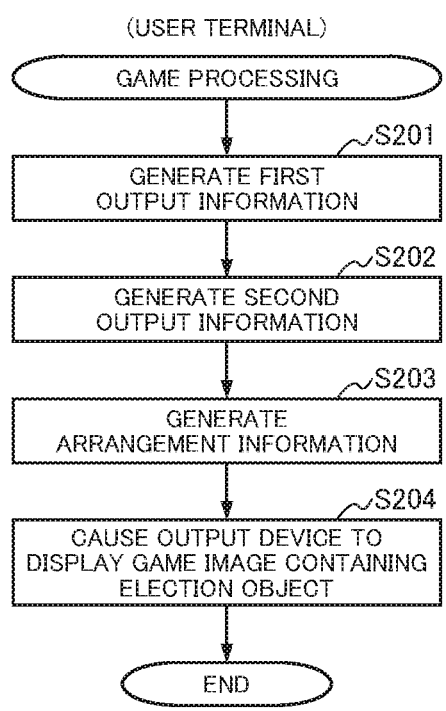
FIG. 6 is a flowchart showing an example of an operation of a terminal side in the game processing corresponding to at least one of the embodiments according to the present invention.

FIG. 6 is a flowchart showing an example of an operation of the terminal 20A side in a case where the terminal 20A carries out the game processing.

The terminal 20A first generates first output information on the basis of information regarding progress of the video game (Step S201). When the first output information is generated, the terminal 20A generates second output information (Step S202). When the second output information is generated, the terminal 20A generates arrangement information (Step S203). When the arrangement information is generated, the terminal 20A causes the display device included therein to display a game image containing a selection object on the basis of the first output information, the second output information, and the arrangement information (Step S204). When the display device is caused to display the game image, the terminal 20A terminates the game processing.

As explained above, as one side of the first embodiment, the user terminal 20A including the functions to control progress of the video game that proceeds in the three-dimensional virtual space in which the virtual camera is arranged is configured so as to include the first generation processing section 22, the second generation processing section 23, the third generation processing section 24, and the output processing section 27. Thus, the first output information is generated on the basis of the information obtained by the virtual camera; the second output information regarding the object configured so as to be selected (hereinafter, referred to as the "selection object") is generated, the selection object indicating the target object that is an object becoming a target of an action when the video game proceeds; the arrangement information regarding arrangement of the selection object indicating the object that is not displayed on the output device (hereinafter, referred to as the "hidden object") among the target objects existing within the angle of view of the virtual camera is generated on the basis of the position of the virtual camera and the position of the hidden object; and the game image containing the selection object is outputted to the output device on the basis of the first output information, the second output information, and the arrangement information. This makes it possible to provide a high convenient GUI.

Namely, it becomes possible to easily select an object that is not displayed in the game image displayed by the display device (for example, an object that cannot be visually recognized because it is positioned at shade of other object, an object that exists within the angle of view of the virtual camera but does not appear in the game image due to influence of the visual volume set up for the virtual camera, and the like). For this reason, the user can easily carry out selection of an object that is not displayed on the display screen, and can easily grasp a position of a selection target that the user is currently allowed to select. Therefore, it becomes possible to obtain a more effective man-machine interface.

In particular, an arrangement position of the object for selection is generated on the basis of the position of the virtual camera and the position of the hidden object. Thus, the user can intuitively grasp an existence position of the hidden object, and can carry out a selection operation, such as a click or a tap, for the selection object displayed so as to correspond to the hidden object. For this reason, it becomes possible to dramatically improve operability in the video game.

In this regard, it has not been mentioned particularly in the embodiment described above. However, the system 100 may be configured so as to include a process to obtain information regarding the progress status of the video game in each terminal. As an example of processing, in the game processing, the terminal 20A first receives an operation via an input section, and transmits information regarding an action instruction corresponding to the received operation (that is, the action instruction information) to the server 10. The server 10 receives the action instruction information from the terminal 20A. Moreover, the server 10 transmits, to the terminal 20A, action related information containing the received action instruction information and action instruction information received from other terminal. The terminal 20A receives the action related information from the server 10. Thus, the terminal 20A obtains information regarding the progress status of the video game that proceeds by operating in each terminal.

Further, it has not been mentioned particularly in the embodiment described above. However, the system 100 may be configured so that the server 10 carries out a part or all of the processes that have been explained as the processes carried out by the terminal side, or so that any of the plurality of terminal 20, 201 to 20N (for example, the terminal 20A) carries out a part or all of the processes that have been explained as the processes carried out by the server 10.

In this regard, it has not been mentioned particularly in the example of the embodiment described above. However, the system 100 may be configured so as to include a storage region for storing various kinds of information constituting the three-dimensional virtual space. As examples of the various kinds of information, there are information regarding the player character object, information regarding the field object, and the like.

In this regard, it has not been mentioned particularly in the example of the embodiment described above. However, the system 100 may be configured so as to include a storage region for storing information regarding the selection object. As an example of the information regarding the selection object, there is information containing information regarding a form of the selection object and information regarding the corresponding target object.

In this regard, it has not been mentioned particularly in the example of the embodiment described above. However, the control section 21 may be configured so that the display device is caused to display a game image in which the selection object is displayed on the near clip plane.

In this regard, it has not been mentioned particularly in the example of the embodiment described above. However, the control section 21 may be further configured so as to generate information regarding arrangement of the selection object that indicates the object to be displayed on the output device (hereinafter, hereinafter, referred to as a "display object") among the target objects that exist within the angle of view of the virtual camera.

In this regard, it has not been mentioned particularly in the example of the embodiment described above. However, the system 100 may be configured so that the selection object cannot be selected when it is displayed on the output device.

In this regard, it has not been mentioned particularly in the example of the embodiment described above. However, the target object may be an object that can become a target of selection (for example, a click or a tap) when it is displayed on the output device.

In this regard, it has not been mentioned particularly in the embodiment described above. However, the terminal 20A may be configured so as to become a so-called "host terminal" to carry out the game processing. In this case, other terminal includes at least a function to receive information from the host terminal, a function to transmit information to the host terminal, and a function to display a game image on the basis of the received information. As an example of the processing, the terminal 20A first generates first output information on the basis of information regarding a progress status of the video game. When the first output information is generated, the terminal 20A generates second output information. When the second output information is generated, the terminal 20A generate arrangement information. When the arrangement information is generated, the terminal 20A outputs a game image containing a selection object to the display device (itself) of the terminal 20A on the basis of the first output information, the second output information, and the arrangement information; generates output information for outputting the game image; and transmits the output information to each of the terminal 201 to 20N. In this regard, it is preferable that the terminal 20A is configured so as to obtain information regarding a progress status of the video game by receiving information regarding an action instruction inputted from other terminal.

In this regard, it has not been mentioned particularly in the embodiment described above. However, as one example of the target object that becomes a target of an action when the video game proceeds, there are an object that becomes a target of an action of the user, an object that becomes a target of an action of a character operated by the user, and a target object of an action of a character operated by the AI.

(Second Embodiment)

Figure 7:
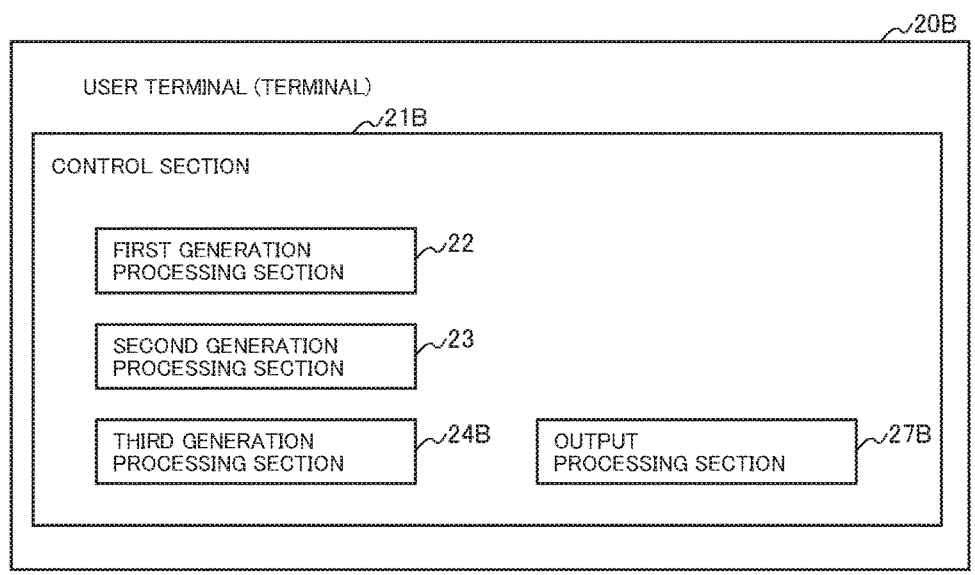
FIG. 7 is a block diagram showing a configuration of a user terminal corresponding to at least one of the embodiments according to the present invention.

FIG. 7 is a block diagram showing a configuration of a user terminal 20B (hereinafter, referred to as a "terminal 20B"), which is an example of the user terminal 20. In the present embodiment, the terminal 20B includes a control section 21B. The control section 21B at least includes a first generation processing section 22, a second generation processing section 23, a third generation processing section 24B, and an output processing section 27B.

The third generation processing section 24B has a function to generate arrangement information so as to be associated with a spot where a hidden object exists when viewed from a position of the virtual camera on the three-dimensional virtual space.

Here, the "spot where the hidden object exists when viewed from the position of the virtual camera on the three-dimensional virtual space" means a spot where the hidden object is displayed in a case where other object shielding the hidden object does not exist when to generate a game image on the basis of first output information. Further, in a case where the hidden object exists outside the visual volume set up for the virtual camera and the object cannot thereby be seen, the spot means a spot where the hidden object is displayed in a case where the visual volume of the virtual camera is set up in a range including the hidden object when the game image is generated on the basis of the first output information.

Further, the "spot" herein is a "position defined on the game image".

Here, the case where the third generation processing section 24B generates, as the arrangement information, coordinate information in a rectangular coordinate system of the game image displayed on a display device will be described. For example, the third generation processing section 24B sets up a three-dimensional virtual space in which only the hidden object and the virtual camera are arranged. Then, the third generation processing section 24B specifies drawing information obtained by the virtual camera, and generates arrangement information in which a spot where the hidden object appears in the drawing information is set to an arrangement coordinate of the selection object in the game image.

The output processing section 27B has a function to cause the display device to display the game image, in which the selection object is displayed, on the basis of the first output information, the second output information, and the arrangement information so as to be associated with the spot where the hidden object exists when viewed from the position of the virtual camera on the three-dimensional virtual space.

Figure 8:
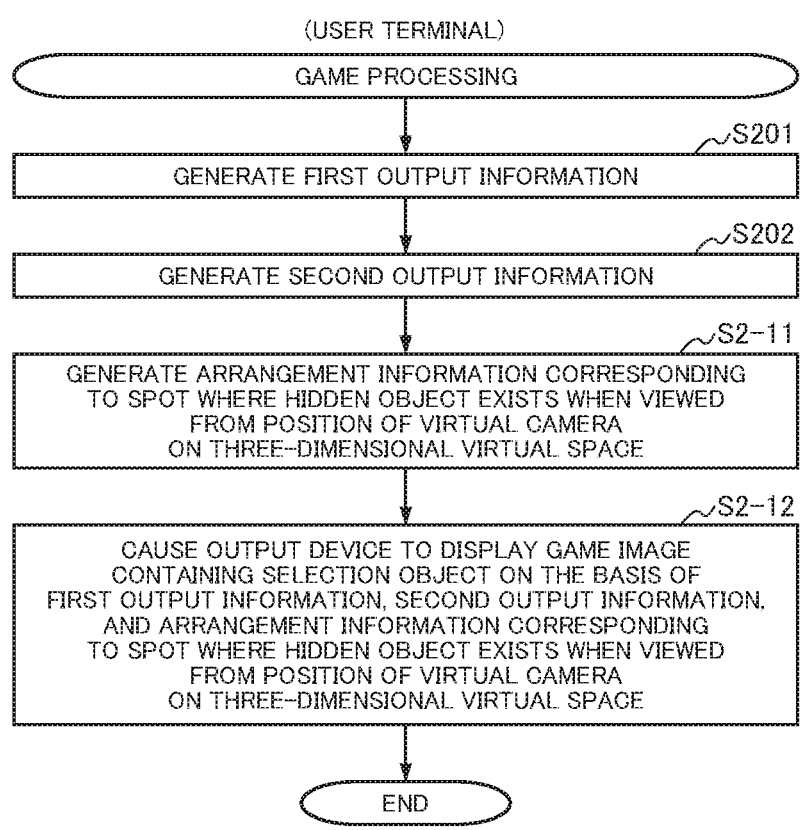
FIG. 8 is a flowchart showing an example of the game processing corresponding to at least one of the embodiments according to the present invention.

FIG. 8 is a flowchart showing an example of the game processing carried out by the system 100 provided with the terminal 20B, which is an example of the terminal 20. Hereinafter, an operation of the terminal 20B will be described as an example. In this regard, an operation of the terminal 20B together with the server 10 is omitted from a point of view to avoid repeated explanation.

When the arrangement information is generated, the terminal 20B generates arrangement information so as to be associated with a spot where the hidden object exists when viewed from a position of the virtual camera on the three-dimensional virtual space (Step S2-11).

Subsequently, the terminal 20B causes the display device to display the game image in which the selection object is displayed on the basis of the first output information, the second output information, and the arrangement information so as to be associated with the spot where the hidden object exists when viewed from the position of the virtual camera on the three-dimensional virtual space (Step S2-12). The terminal 20B then terminates the game processing.

As explained above, as one side of the second embodiment, the user terminal 20B is configured so as to include the control section 21B provided with the first generation processing section 22, the second generation processing section 23, the third generation processing section 24B, and the output processing section 27B. Thus, the arrangement information is generated so as to be associated with the spot where the hidden object exists when viewed from the position of the virtual camera on the three-dimensional virtual space, and the game image in which the selection object is displayed, is outputted to the output device on the basis of the first output information, the second output information, and the arrangement information so as to be associated with the spot where the hidden object exists when viewed from the position of the virtual camera on the three-dimensional virtual space. Therefore, it is possible to improve operability.

In particular, the object for selection is generated at the spot where the hidden object exists when viewed from the position of the virtual camera on the three-dimensional virtual space. Thus, it becomes possible to intuitively grasp an existence position of the hidden object, and can easily carry out selection of the hidden object. For this reason, it becomes possible to improve operability in the video game dramatically.

Further, it has not been mentioned particularly in the example of the embodiment described above. However, the control section 21B may be configured so that the display device is caused to display the game image in which the selection object is generated at the spot where the hidden object exists when viewed from the position of the virtual camera on the three-dimensional virtual space by combining a first layer image and a second layer image using two three-dimensional virtual spaces. More specifically, the control section 21B generates the first layer image on the basis of the first output information obtained by photographing a first three-dimensional virtual space, in which a player character object and a field object are arranged, by means of the virtual camera. Subsequently, the control section 21B generates the second three-dimensional virtual space on the basis of the coordinate information in a second three-dimensional virtual space of the selection object. The control section 21B generates the second layer image on the basis of the information obtained by photographing the second three-dimensional virtual space by means of the virtual camera. Moreover, the control section 21B causes the display device to display the game image generated by superimposing the second layer image on the first layer image. In this case, it is preferable that the position and the angle of view of the virtual camera arranged in the first three-dimensional virtual space are the same as the position and the angle of view of the virtual camera arranged in the second three-dimensional virtual space. By configuring the user terminal 20B in this manner, a display size of the selection object varies in accordance with a distance, and this makes it possible to improve visibility dramatically.

In this regard, it has not been mentioned particularly in the example of the embodiment described above. However, the system 100 may be configured so that the arrangement information indicates a coordinate position of the three-dimensional space. For example, in place of the configuration described above, the control section 21B may be configured so as to generate arrangement information in which a spot where the line connecting the position of the virtual camera and the hidden object intersects with the near clip plane within the three-dimensional virtual space is set to an arrangement spot. In this case, the system 100 may be configured so as to cause the display device to display a game image obtained by drawing it so that the selection object arranged at a spot within the three-dimensional virtual space, which is indicated by the arrangement information is at least contained.

(Third Embodiment)

Figure 9:
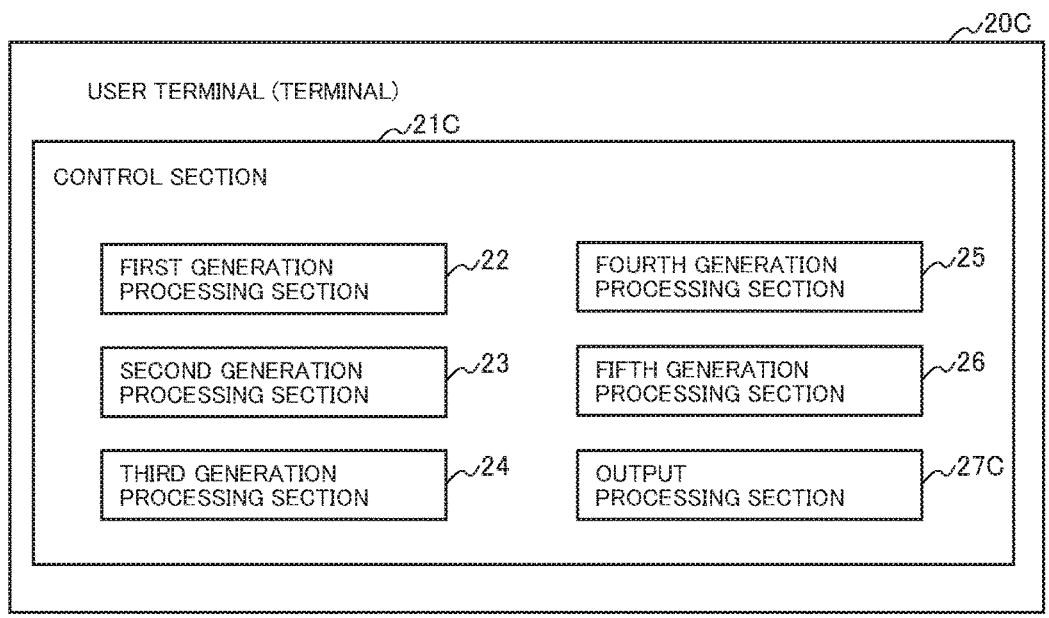
FIG. 9 is a block diagram showing a configuration of the user terminal corresponding to at least one of the embodiments according to the present invention.

FIG. 9 is a block diagram showing a configuration of a user terminal 20C (hereinafter, referred to as a "terminal 20C"), which is an example of the user terminal 20. As shown in FIG. 9, the terminal 20C includes a control section 21C. The control section 21C at least includes a first generation processing section 22, a second generation processing section 23, a third generation processing section 24, a fourth generation processing section 25, a fifth generation processing section 26, and an output processing section 27C.

The fourth generation processing section 25 has a function to generate third output information regarding a map image that indicates a bird's eye image (or an overview image) of a three-dimensional virtual space. Here, the map image displayed by the third output information may be one in which the whole three-dimensional virtual space is displayed from a fixed point, or one in which a part of the three-dimensional virtual space is displayed.

The fifth generation processing section 26 has a function to generate fourth output information regarding an object (hereinafter, referred to as a "second selection object"), which indicates a position of the map image corresponding to a position of a target object in the three-dimensional virtual space and is configured so as to be selected. Here, it is desired that the information regarding the arrangement of the second selection object indicates a position at which the corresponding target object is displayed in the map image.

The output processing section 27C causes a display device to display a game image containing the map image, in which the second selection object is displayed, on the basis of the first output information, the second output information, the arrangement information, the third output information, and the fourth output information.

Figure 10:
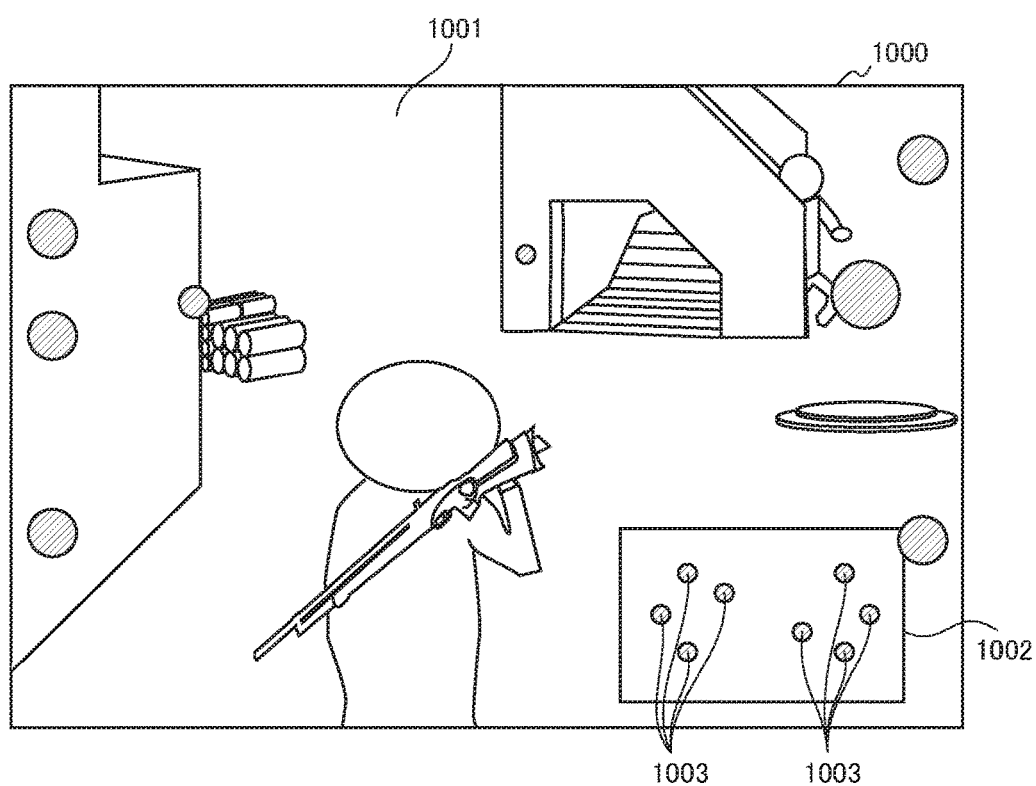
FIG. 10 is an explanatory drawing for explaining an example of a display screen corresponding to at least one of the embodiments according to the present invention.

FIG. 10 is an explanatory drawing for explaining an example of the display screen corresponding to at least one of the embodiments according to the present invention. As shown in FIG. 10, a game image 1001 displayed on a display screen 1000 contains a map image 1002 displayed on the basis of the third output information, and a second selection object 1003 displayed on the basis of the fourth output information.

Figure 11:
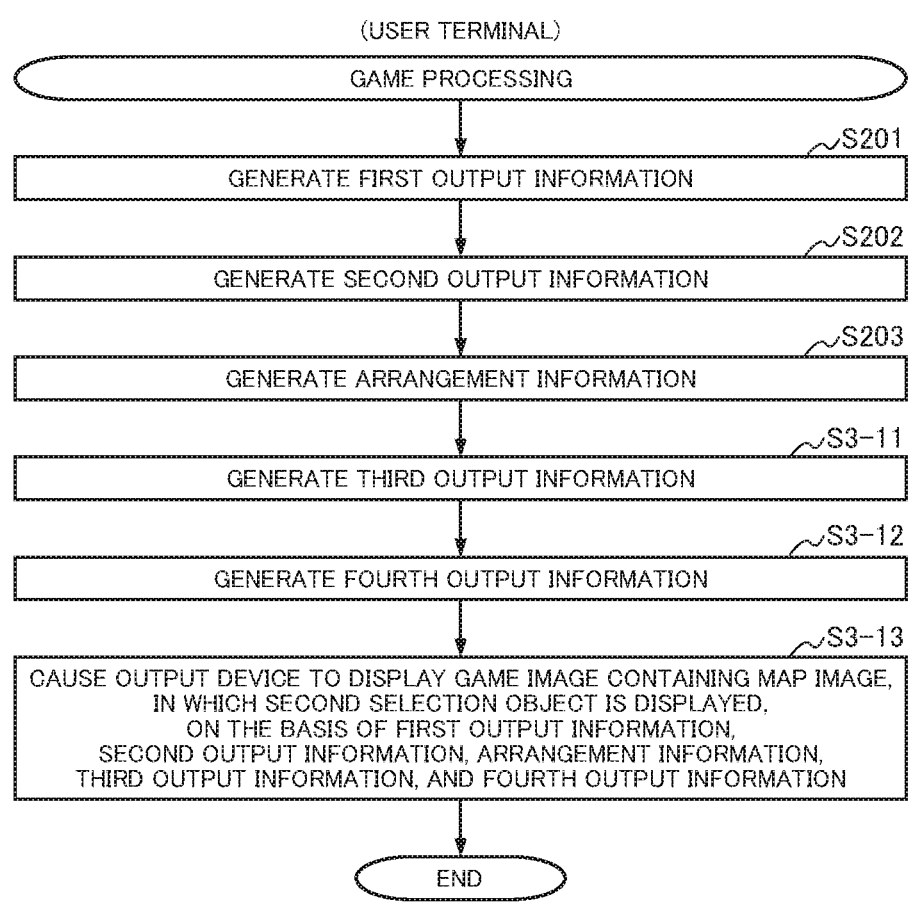
FIG. 11 is a flowchart showing an example of the game processing corresponding to at least one of the embodiments according to the present invention.

FIG. 11 is a flowchart showing an example of the game processing carried out by the terminal 20. Hereinafter, an operation of the terminal 20C will be described as an example. In this regard, an operation of the terminal 20C together with the server 10 is omitted from a point of view to avoid repeated explanation.

When the arrangement information is generated (Step S203), the terminal 20C generates third output information (Step S3-11). For example, the fourth generation processing section 25 generates the third output information regarding the map image, which indicates the bird's eye image of the three-dimensional virtual space.

When the third output information is generated, the terminal 20C generates fourth output information (Step S3-12). For example, the fifth generation processing section 26 generates the fourth output information regarding the second selection object.

Subsequently, the terminal 20C causes the display device to display a game image containing a map image, in which the second selection object is displayed, on the basis of the first output information, the second output information, the arrangement information, the third output information, and the fourth output information (Step S3-13). The terminal 20C then terminates the game processing.

As explained above, as one side of the third embodiment, the user terminal 20C is configured so as to include the control section 21C provided with the first generation processing section 22, the second generation processing section 23, the third generation processing section 24, the fourth generation processing section 25, the fifth generation processing section 26, and the output processing section 27C. Thus, the third output information regarding the map image that indicates the bird's eye image of the three-dimensional virtual space is generated; the position of the map image corresponding to the position of the target object in the three-dimensional virtual space is indicated; the fourth output information regarding the object configured so as to be selected (hereinafter, referred to as the "second selection object") is generated; and the game image containing the map image in which the second selection object is displayed is outputted on the basis of the first output information, the second output information, the arrangement information, the third output information, and the fourth output information. Therefore, it is possible to improve operability.

In particular, by selecting any of the selection object appearing in a battle field or the selection object displayed on the map, it becomes possible to carry out selection of one target object. Therefore, it is possible to increase the number of objects from which one target object is to be selected by making use of characteristics of the video game, and this makes it possible to realize improvement of a user interface and improvement of operability thereof.

In this regard, it has not been mentioned particularly in the embodiment described above. However, the control section 21C may be configured so as to: refer to a storage region for storing information regarding the map image of the battle field in advance; and obtain output information regarding the map image (hereinafter, referred to as "image data"). As one example of the information regarding the map image, there is information in which the image data of the map image are associated with an ID of the battle field. In this case, the system 100 may be configured so as to: refer to the storage region when selection of the battle field is received; specify a map image corresponding to the selected battle field; and thereby generate the third output information.

(Fourth Embodiment)

In a fourth embodiment, a video game according to the present embodiment will be described in detail.

Here, the video game according to the present embodiment is a video game in which a plurality of character objects is divided into an enemy team and a friend team within a predetermined game field and a user tries to reduce an energy of the enemy team. An energy with a predetermined value is associated with each of the teams. The energy of the enemy team is reduced by an attack against an enemy character, an attack against a predetermined facility, or suppression of a predetermined facility, and the like. One team whose residual quantity of the energy after a character time limit terminates is more than the other, or one team that reduces the energy of an opponent team to zero within the time limit becomes a victory team.

One main player character object directly operated by a player (hereinafter, referred to simply as a "player character") and four support player character objects called as a "colleagues" (hereinafter, referred to simply as a "support character object") are contained in the teams. Each of the support characters is an AI character operated with an AI (Artificial Intelligence). In a case where an instruction is received from the user, each of the support characters operates on the basis of the instruction. A team color is set up to each team.

The respective player characters are associated with lives independently. In a case where an attack from the player character of the enemy team is received, the life reduces. When the life of the player character becomes zero, the player character becomes an action impossible state. When the player character becomes the action impossible state, the energy of its own team reduces. The player character that became the action impossible state is allowed to carry out an action again from a predetermined spot after a predetermined time elapses.

Here, the game field is constructed by a predetermined region. Various kinds of field objects are arranged in a field in which a fight is carried out. An object such as a building, and a wall that is not related to the reduction of the energy described above directly, and a facility object directly related to the reduction of the energy described above (for example, the target object as described above) are contained. At least one target object is arranged.

A facility that can be suppressed by the team (here, referred to as a "post trigger") exists in the facility object. The post trigger is an object to which a predetermined region is set up. The predetermined region according to the present embodiment has an area to the extent that one player character object fits with an enough room. When the character object exists in the predetermined region for a predetermined time, the team to which the character object belongs suppresses the post trigger.

The game image is generated on the basis of information obtained by the virtual camera. The position of the virtual camera is set up by the user appropriately. For example, the system 100 can be configured so as to photograph the game image from a rear of the player character toward the line of sight of the player character. Various kinds of information regarding the progress status of the video game are displayed in the game image. The field object, an action of the character object, a suppression status of a facility, information of each of the player characters, an input icon for sending an instruction to the support player characters, and the like are contained in the various kinds of information.

A display form of the selection object varies in accordance with the team color of the team that suppresses. Further, the display form of the selection object varies so that the user can grasp a progress status of the suppression. The selection object is displayed so as to exist at a position where the corresponding facility object exists and at about a height of an eye level of the character. Even in a case where a shielding object toward the selection object (for example, an object that shields a field of view) exists, the selection object is displayed on the display screen regardless of the shielding object. In a case where the selection object is positioned within the field of view, the selection object is displayed in a similar display mode to the case where there is no shielding object. On the other hand, in a case where the selection object is positioned outside the field of view, the selection object is displayed at a predetermined region on the end-to-side of the display screen so as to correspond to an existence direction of the selection object.

The user is allowed to give an instruction to the support player character. As examples of the instruction, there are an attack against the enemy character, movement to and waiting at a designated place, or tracking to the main player character, and the like. An instruction command with which the instruction content is associated is displayed on the display screen, and the user is allowed to give an instruction thereto by selecting the corresponding instruction command. When to specify a place, the user can select the selection object described above. Here, a concrete flow of an instruction when the user instructs a support player character A to move to a post trigger Z will be described briefly. The user first selects the support player character A as a target to which the instruction is to be sent. Subsequently, the user selects the selection object corresponding to the post trigger Z. Moreover, the user carries out an input of a command corresponding to movement (for example, a pressing input to an icon displayed for a command). This causes the support player character A to start to move toward the post trigger Z.

Further, when to instruct the support player character to move toward a predetermined place (hereinafter, referred to also as a "target position"), two routes are displayed on a map displayed on the display screen (which will be described later). As these routes, a route from a current position of the support player character, which becomes a target to which an instruction is given, to the target position is indicated. The user is allowed to further send an instruction as to whether to move on any route of the two routes.

Namely, when to instruct the support player character to move to the predetermined place (or the target position), the user at least specifies the support player character of the instruction target, the target position, and the route.

A map on which at least a part of region of the game field is displayed as a bird's eye image is displayed on the display screen. A position of the facility object, a position of each of the player character, and the like are displayed on the map. The selection object is displayed at the position of the facility object. The user can realize designation of the facility by selection of the selection object displayed on the map when to send an instruction to the support player character. Further, the map may be enlarged in response to an operational input from the user.

The user is allowed to select any of various objects (that is, targeting) in addition to the selection object described above. For example, the player character and the support character of the enemy team may become a target of the targeting. There is a mode in which the targeting is carried out, and such a mode is referred to as a "targeting mode". The player character cannot carry out an attack during the targeting mode. Further, a prediction element as to what is targeted by carrying out the targeting now is displayed during the targeting mode. As an example of the "prediction element", there is a grid-line object by which a target that is to be targeted by carrying out the targeting now is surrounded, for example. Further, in a case where a plurality of objects overlaps with each other, the overlapping objects may be a target on which the "prediction element" is displayed. In this case, a "prediction element" corresponding to an object having the highest degree of priority is displayed preferentially on the basis of degrees of priority according to attributes of the objects set up in advance.

By including the video game processing server 10 and the plurality of the user terminals 20, 201 to 20N, the video game processing system 100 realizes various kinds of functions to control progress of the video game that proceeds in response to an operation of the user in the three-dimensional virtual space in which the virtual camera is arranged.

Here, a "first three-dimensional virtual space" in which the player character and the field object are arranged and a "second three-dimensional virtual space" in which any player character and any field object are not arranged are included in the three-dimensional virtual space according to the present embodiment.

Here, a virtual camera is arranged in each of the first three-dimensional virtual space and the second three-dimensional virtual space. Each of a "first virtual camera" arranged in the first three-dimensional virtual space and a "second virtual camera" arranged in the second three-dimensional virtual space has the same arrangement coordinate. Hereinafter, in a case where the virtual camera is merely mentioned, it denotes the first virtual camera.

Figure 12:
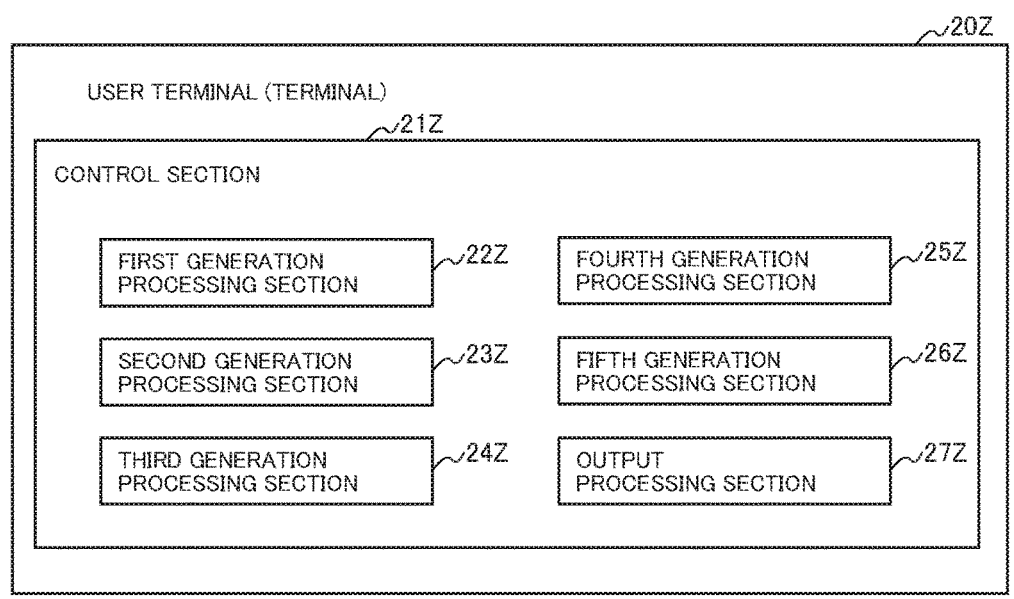
FIG. 12 is a block diagram showing a configuration of the user terminal corresponding to at least one of the embodiments according to the present invention.

FIG. 12 is a block diagram showing a configuration of a user terminal 20Z (hereinafter, referred to as a "terminal 20Z"), which is an example of the user terminal 20. As shown in FIG. 12, the terminal 20Z includes a control section 21Z. The control section 21Z at least includes a first generation processing section 22Z, a second generation processing section 23Z, a third generation processing section 24Z, a fourth generation processing section 25Z, a fifth generation processing section 26Z, and an output processing section 27Z.

The first generation processing section 22Z has a function to generate first output information.

Here, the first output information denotes information to be generated on the basis of information obtained by the first virtual camera. The information obtained by the first virtual camera is information for outputting an image (hereinafter, referred to as a "first layer image"), which represents a state of the first three-dimensional virtual space in which the player character object and the field object are arranged.

The second generation processing section 23Z has a function to generate second output information.

Here, the second output information is information regarding the selection object. More specifically, the second output information is information indicating the second three-dimensional virtual space generated on the basis of coordinate information of the selection object. The coordinate information of the selection object is stored in a predetermined storage region.

The third generation processing section 24Z has a function to generate arrangement information.

Here, the arrangement information is information regarding arrangement of the selection object indicating a hidden object, and is information obtained by photographing the second three-dimensional virtual space by means of the virtual camera. In particular, the arrangement information is information for outputting a second layer image in which the selection object indicating the hidden object is displayed. Since an arrangement position of the selection object is associated with an arrangement position of the hidden object, the arrangement information is generated on the basis of the position of the virtual camera and the position of the hidden object.

In particular, the third generation processing section 24Z generates the arrangement information so as to correspond to the spot where the hidden object exists when viewed from the position of the virtual camera on the three-dimensional virtual space. More specifically, although a space to be arranged is different from the first virtual camera, the second virtual camera is arranged so that the coordinate position thereof becomes the same as the "arrangement coordinate of the first virtual camera in the first three-dimensional virtual space". In addition, although a space to be arranged is different from the first three-dimensional virtual space, the selection object is arranged in the second three-dimensional virtual space so that the coordinate position corresponds to the "coordinate position of the target object in the first three-dimensional virtual space". Thus, by arranging the second virtual camera and the selection object in the second three-dimensional virtual space, the arrangement position of the selection object corresponds to the spot where the hidden object exists when viewed from the position of the virtual camera on the three-dimensional virtual space in a case where the layer images generated by the arrangement are superimposed.

The fourth generation processing section 25Z has a function to generate third output information regarding a map image that indicates the bird's eye image of the three-dimensional virtual space. Here, the map image displayed by the third output information may be one in which the whole three-dimensional virtual space is displayed from a fixed point, or may be one in which a part of the three-dimensional virtual space is displayed.

The fifth generation processing section 26Z has a function to generate fourth output information regarding an object (hereinafter, referred to as a "second selection object"), which indicates a position of the map image corresponding to a position of the target object in the three-dimensional virtual space and is configured so as to be selected. Here, it is desired that the information regarding the arrangement of the second selection object indicates a position at which the corresponding target object is displayed in the map image.

The output processing section 27Z has a function to output a game image containing the selection object to an output device. In particular, the output processing section 27Z generates a first layer image on the basis of the first output information. Subsequently, the output processing section 27Z generates a second layer image in which the selection object is displayed on the basis of the second output information and the arrangement information. Moreover, the output processing section 27Z generates a third layer image on the basis of the third output information and the fourth output information. Then, the output processing section 27Z superimposes the second layer image on the first layer image, and further superimposes the third layer image thereon. Thus, the output processing section 27Z generates a game image in which the selection object and the map are displayed so as to be visually recognized.

Figure 13:
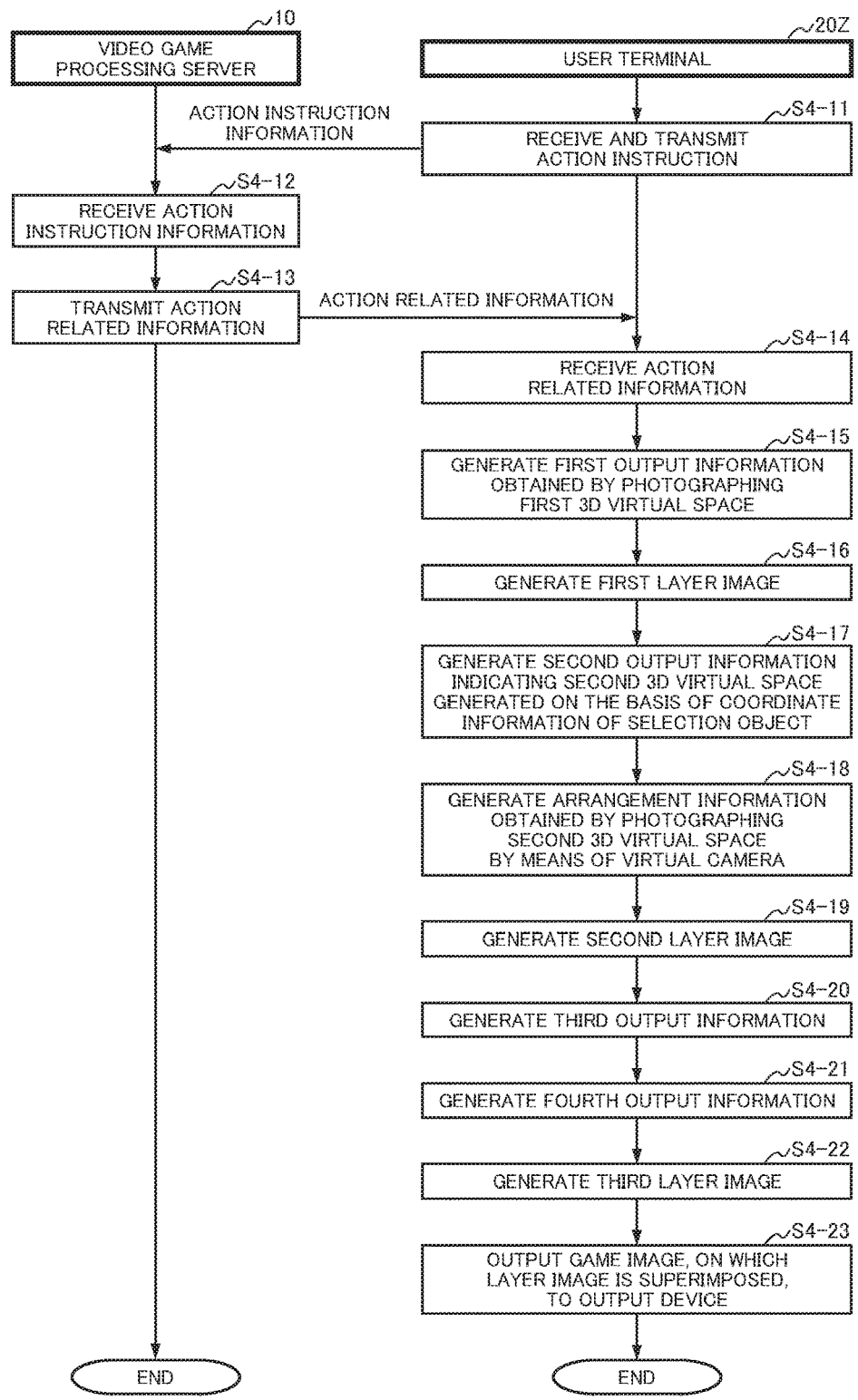
FIG. 13 is a flowchart showing an example of the game processing corresponding to at least one of the embodiments according to the present invention.

FIG. 13 is a flowchart showing an example of the game processing carried out by the system 100. In the game processing according to the present embodiment, processing for controlling progress of the video game that proceeds in the three-dimensional virtual space in which the virtual camera is arranged is carried out in response to an operation of the user. Hereinafter, the case where the server 10 and the user terminal 20Z (the terminal 20Z) carry out the game processing as a process related to the video game will be described as an example. In the game processing according to the present embodiment, a predetermined process is repeated until the fighting game is terminated.

In the game processing, the terminal 20Z first receives an action instruction, and transmits action instruction information regarding the action instruction (Step S4-11). In the present embodiment, the terminal 20Z receives an operation via an input section, and transmits, to the server 10, information (hereinafter, referred to as "action instruction information") regarding an action instruction corresponding to the received operation.

The server 10 receives the action instruction information from the terminal 20Z (Step S4-12).

The server 10 transmits, to the terminal 20Z, action related information containing the received action instruction information and action instruction information received from other terminal (Step S4-13). Here, when the server 10 transmits the action related information to the terminal 20Z, the server 10 terminates the game processing.

The terminal 20Z receives the action related information from the server 10 (Step S4-14). Thus, the terminal 20Z receives, from the server 10, information regarding a progress status of the video game that proceeds by operating each of the terminals.

Subsequently, the terminal 20Z generates first output information obtained by photographing the first three-dimensional virtual space on the basis of the received action related information (Step S4-15).

When the first output information is generated, the terminal 20Z generates a first layer image on the basis of the first output information (Step S4-16).

When the first layer image is generated, the terminal 20Z generates second output information that indicates the second three-dimensional virtual space generated on the basis of the coordinate information of the selection object (Step S4-17).

When the second layer image is generated, the terminal 20Z generates arrangement information obtained by photographing the second three-dimensional virtual space by means of the virtual camera (Step S4-18).

When the second output information and the arrangement information are generated, the terminal 20Z generates a second layer image on the basis of the second output information and the arrangement information (Step S4-19).

When the second layer image is generated, the terminal 20Z generates third output information (Step S4-20).

When the third output information is generated, the terminal 20Z generates fourth output information (Step S4-21).

When the third output information and the fourth output information are generated, the terminal 20Z generates a third layer image on the basis of the third output information and the fourth output information (Step S4-22).

Subsequently, the terminal 20Z outputs, to the output device, a game image obtained by superimposing the second layer image on the first layer image and further superimposing the third layer image thereon (Step S4-23). The terminal 20Z then terminates the game processing.

As explained above, as one side of the fourth embodiment, the user terminal 20Z including the functions to control progress of the video game that proceeds in the three-dimensional virtual space in which the virtual camera is arranged is configured so as to at least include the first generation processing section 22Z, the second generation processing section 23Z, the third generation processing section 24Z, and the output processing section 27Z. Thus, the first output information is generated on the basis of the information obtained by the virtual camera; the target object that is an object becoming a target of the action when the video game proceeds is indicated; the second output information regarding the object (hereinafter, referred to as the "selection object"), which is configured so as to be selectable, is generated; the arrangement information regarding arrangement of the selection object, which indicates the object (hereinafter, referred to as the "hidden object") that is not displayed to the output device, of the target objects that exist within the angle of view of the virtual camera is generated on the basis of the position of the virtual camera and the position of the hidden object; the game image containing the selection object is outputted to the output device on the basis of the first output information, the second output information, and the arrangement information. Therefore, it is possible to provide a high convenient GUI.

Further, as explained in the example of the embodiment described above, the user terminal 20Z generates the arrangement information so as to be associated with the spot where the hidden object exists when viewed from the position of the virtual camera on the three-dimensional virtual space. Therefore, it is possible to improve operability.

Further, as explained in the example of the embodiment described above, the user terminal 20Z is configured so as to include the control section 21C provided with at least the first generation processing section 22, the second generation processing section 23, the third generation processing section 24, the fourth generation processing section 25, the fifth generation processing section 26, and the output processing section 27C. Thus, the third output information regarding the map image that indicates the bird's eye image of the three-dimensional virtual space is generated; the position of the map image corresponding to the position of the target object in the three-dimensional virtual space is indicated; the fourth output information regarding the object configured so as to be selected (hereinafter, referred to as the "second selection object") is generated; and the game image containing the map image in which the second selection object is displayed is outputted on the basis of the first output information, the second output information, the arrangement information, the third output information, and the fourth output information. Therefore, it is possible to improve operability.

In this regard, it has not been mentioned particularly in the example of the embodiment described above. However, the system 100 may be configured so that the arrangement information relates to arrangement of a selection object indicating a target object that does not become the hidden object. Namely, the system 100 may be configured so as to contain information regarding arrangement of a selection object indicating a target object that exists outside the angle of view of the virtual camera. The system 100 may be configured so that the selection object is displayed in a predetermined region at an end-to-side portion on the display screen by being associated with a presence direction of the selection object.

In this regard, it has not been mentioned particularly in the example of the embodiment described above. However, the control section 21Z may be configured so as to generate second output information in which a form of the selection object varies in accordance with progress of the video game. As a concrete example, the control section 21Z may be configured so as to: obtain information regarding a conquest status of the target object; and generate second output information in which the form of the selection object is determined on the basis of the information regarding the conquest status.

In this regard, in each of the embodiments described above, each of the plurality of user terminals 20, 201 to 20N and the video game processing server 10 carries out the various kinds of processing described above in accordance with various kinds of control programs stored in the storage device with which the corresponding terminal or server is provided.

Further, the configuration of the video game processing system 100 is not limited to the configuration that has been explained as the example of the respective embodiments described above. For example, the video game processing server 10 may be configured so that a part or all of the processing that have been explained as the processing carried out by the user terminal is carried out by the video game processing server 10. Alternatively, the video game processing system 100 may be configured so that a part or all of the processing that have been explained as the processing carried out by the video game processing server 10 is carried out by any of the plurality of user terminals 20 and 201 to 20N (for example, the user terminal 20). Further, the video game processing system 100 may be configured so that a part or all of the storage sections included by the video game processing server 10 is included in any of the plurality of user terminals 20 and 201 to 20N. Namely, the video game processing system 100 may be configured so that a part or all of the functions included in any one of the user terminal 201 and the video game processing server 10 according to the video game processing system 100 is included in the other.

Further, the program product may be configured so as to cause a single apparatus that does not include a communication network to realize a part or all of the functions, which have been explained as the examples of the respective embodiments described above.

In this regard, the word "in accordance with progress of the video game" means that occurrence of various kinds of progress or changes and the like that can be generated in the video game becomes timing or a standard of the processing of specifying. As an example of the processing of specifying, there are a determining process, an information updating process and the like. Further, as examples of the various kinds of progress or changes that can be generated in the video game, there are progress of time, a change in the game element value, a specific status or update of a flag, an operational input by the user, and the like.

(Appendix)

The explanation of the embodiments described above has been described so that the following inventions can be at least realized by a person having a normal skill in the art to which the present invention belongs.

(1)

A non-transitory computer-readable medium including a program product for causing a user terminal to realize functions to control progress of a video game, the video game proceeding in a three-dimensional virtual space, a virtual camera being arranged in the three-dimensional virtual space, wherein the functions include:

a first generating function configured to generate first output information on the basis of information obtained by the virtual camera;

a second generating function configured to generate second output information regarding a selection object, the selection object indicating a target object, the selection object being configured to be able to be selected, the target object being a target of an action when the video game proceeds;

a third generating function configured to generate arrangement information regarding arrangement of the selection object indicating a hidden object on the basis of a position of the virtual camera and a position of the hidden object, the hidden object being the target object existing within an angle of view of the virtual camera and not displayed on an output device; and an outputting function configured to output a game image to the output device on the basis of the first output information, the second output information, and the arrangement information, the game image containing the selection object.

(2)

The non-transitory computer-readable medium according to claim (1), wherein the third generating function includes a function configured to generate the arrangement information so as to be associated with a spot where the hidden object exists when viewed from the position of the virtual camera on the three-dimensional virtual space.

(3)

The non-transitory computer-readable medium according to claim (1) or (2), wherein the video game is a video game in which at least one character object operates, in response to an operation of the user, within the three-dimensional virtual space in which objects are arranged, and wherein the target object indicated by the selection object is an object being a target of an action of the character object when the video game proceeds.

(4)

The non-transitory computer-readable medium according to any one of claims (1) to (3), wherein the functions further include:

a fourth generating function configured to generate third output information regarding a map image, the map image indicating a bird's-eye image of the three-dimensional virtual space; and a fifth generating function configured to generate fourth output information regarding a second selection object, the second selection object indicating a position of the map image corresponding to the position of the target object in the three-dimensional virtual space, the second selection object being configured to be able to be selected, and wherein the outputting function further includes a function configured to output, on the basis of the third output information and the fourth output information, the game image containing the map image in which the second selection object is displayed.

(5)

The non-transitory computer-readable medium according to any one of claims (1) to (4), wherein the functions further include:

a function configured to generate a first layer image on the basis of the first output information obtained by photographing a first three-dimensional virtual space by means of a first virtual camera, a player character object and a field object being arranged in the first three-dimensional virtual space;

a function configured to generate a second three-dimensional virtual space on the basis of coordinate information of the selection object in a second three-dimensional space;

a function configured to generate a second layer image on the basis of information obtained by photographing the second three-dimensional virtual space by means of a second virtual camera; and a function configured to cause a output device to display a game image generated by superimposing the second layer image on the first layer image.

(6)

A non-transitory computer-readable medium including a program product for causing a server to realize at least one function of the functions that the program product described in any one of claims (1) to (5) causes the user terminal to realize, the server being capable of communicating with the user terminal.

(7)

A user terminal into which the program product included in any of claims (1) to (6) is installed.

(8)

A system for controlling progress of a video game, the system including a communication network, a server, and a user terminal, the video game proceeding in a three-dimensional virtual space, a virtual camera being arranged in the three-dimensional virtual space, the system comprising:

a first generating section configured to generate first output information on the basis of information obtained by the virtual camera;

a second generating section configured to generate second output information regarding a selection object, the selection object indicating a target object, the selection object being configured to be able to be selected, the target object being a target of an action when the video game proceeds;

a third generating section configured to generate arrangement information regarding arrangement of the selection object indicating a hidden object on the basis of a position of the virtual camera and a position of the hidden object, the hidden object being the target object existing within an angle of view of the virtual camera and not displayed on an output device of the user terminal;

a transmitting section configured to transmit output information for outputting a game image on the basis of the first output information, the second output information, and the arrangement information, the game image containing the selection object; and an outputting section configured to output the game image to the output device on the basis of the output information.

(9)

The system according to claim (8), wherein the server includes the first generating section, the second generating section, the third generating section, and the transmitting section, and wherein the user terminal include:

a receiving section configured to receive information for outputting a game image on a display screen of the output device, the game image containing the selection object generated on the basis of the first output information, the second output information, and the arrangement information; and the outputting section.

(10)

A non-transitory computer-readable medium including a program product for causing a server to realize functions to control progress of a video game, the video game proceeding in a three-dimensional virtual space, a virtual camera being arranged in the three-dimensional virtual space, wherein the functions include:

a first generating function configured to generate first output information on the basis of information obtained by the virtual camera;

a second generating function configured to generate second output information regarding a selection object, the selection object indicating a target object, the selection object being configured to be able to be selected, the target object being a target of an action when the video game proceeds;

a third generating function configured to generate arrangement information regarding arrangement of the selection object indicating a hidden object on the basis of a position of the virtual camera and a position of the hidden object, the hidden object being the target object existing within an angle of view of the virtual camera and not displayed on an output device of a user terminal; and a transmitting function configured to transmit, to the user terminal, information for causing the output device to output a game image on the basis of the first output information, the second output information, and the arrangement information, the game image containing the selection object.

(11)

A non-transitory computer-readable medium including a program product for causing a user terminal to realize at least one function of the functions that the program product described in claim (10) causes the server to realize, the user terminal being capable of communicating with the server.

(12)

A server into which the program product included in claim (10) or (11) is installed.

(13)

A non-transitory computer-readable medium including a program product for causing a user terminal to realize functions to control progress of a video game, the video game proceeding in a three-dimensional virtual space, a virtual camera being arranged in the three-dimensional virtual space, wherein a server includes:

a first generating function configured to generate first output information on the basis of information obtained by the virtual camera;

a second generating function configured to generate second output information regarding a selection object, the selection object indicating a target object, the selection object being configured to be able to be selected, the target object being a target of an action when the video game proceeds;

a third generating function configured to generate arrangement information regarding arrangement of the selection object indicating a hidden object on the basis of a position of the virtual camera and a position of the hidden object, the hidden object being the target object existing within an angle of view of the virtual camera and not displayed on a display screen of a output device of the user terminal; and a transmitting function configured to transmit, to the user terminal, information for causing the output device to output a game image on the basis of the first output information, the second output information, and the arrangement information, the game image containing the selection object, and wherein the functions include:

a receiving function configured to receive, from the server, information for outputting the game image on the display screen of the output device of the user terminal.

(14)

A method of controlling progress of a video game, the video game proceeding in a three-dimensional virtual space, a virtual camera being arranged in the three-dimensional virtual space, the method comprising:

a first generating process configured to generate first output information on the basis of information obtained by the virtual camera;

a second generating process configured to generate second output information regarding a selection object, the selection object indicating a target object, the selection object being configured to be able to be selected, the target object being a target of an action when the video game proceeds;

a third generating process configured to generate arrangement information regarding arrangement of the selection object indicating a hidden object on the basis of a position of the virtual camera and a position of the hidden object, the hidden object being the target object existing within an angle of view of the virtual camera and not displayed on an output device; and an outputting process configured to output a game image to the output device on the basis of the first output information, the second output information, and the arrangement information, the game image containing the selection object.

(15)

A method of controlling progress of a video game, the method being carried out by a system including a communication network, a server, and a user terminal, the video game proceeding in a three-dimensional virtual space, a virtual camera being arranged in the three-dimensional virtual space, the method comprising:

a first generating process configured to generate first output information on the basis of information obtained by the virtual camera;

a second generating process configured to generate second output information regarding a selection object, the selection object indicating a target object, the selection object being configured to be able to be selected, the target object being a target of an action when the video game proceeds;

a third generating process configured to generate arrangement information regarding arrangement of the selection object indicating a hidden object on the basis of a position of the virtual camera and a position of the hidden object, the hidden object being the target object existing within an angle of view of the virtual camera and not displayed on an output device of the user terminal;

a transmitting process configured to transmit output information for outputting a game image on the basis of the first output information, the second output information, and the arrangement information, the game image containing the selection object; and an outputting process configured to output the game image to the output device on the basis of the output information.

(16)

The non-transitory computer-readable medium according to any one of claims (1) to (5), wherein the functions further include:

a function configured to obtain information regarding a conquest status of the target object, and wherein the second generating function includes a function configured to generate the second output information in which a form of the selection object is determined on the basis of information regarding the conquest status.

(17)

The non-transitory computer-readable medium according to any one of claims (1) to (5) and (16), wherein the third generating function includes a function configured to generate information regarding arrangement of a selection object, the selection object indicating a target object (hereinafter, referred to as a "display object") of target objects that exist within an angle of view of the virtual camera, the display object being displayed on the output device.

According to one of the embodiments of the present invention, it is useful for a video game that proceeds in a three-dimensional virtual space.

What is claimed is:

1. A non-transitory computer-readable medium including a program product for causing a user terminal to control progress of a video game, the video game proceeding in a first three-dimensional virtual space, a first virtual camera being arranged in the first three-dimensional virtual space, the program product, when executed, causing the user terminal to:

generate first output information based on information obtained by the first virtual camera;

generate second output information regarding a selection object, the selection object indicating a target object, the selection object being configured to be selected, the target object being a target of an action when the video game proceeds;

generate arrangement information regarding arrangement of the selection object indicating a hidden object based on a position of the first virtual camera and a position of the hidden object, the hidden object being the target object existing within an angle of view of the first virtual camera and not displayed on an output device; and output a game image to the output device on the basis of the first output information, the second output information, and the arrangement information, the game image containing the selection object, wherein the selection object indicates the position of the hidden object and is generated by superimposing a second layer image on a first layer image, the first layer image being generated based on the first output information obtained by photographing the first three-dimensional virtual space by the first virtual camera, the second layer image being generated based on the second output information and the arrangement information obtained by photographing a second three-dimensional virtual space by a second virtual camera.

2. The non-transitory computer-readable medium according to claim 1, wherein the arrangement information is generated so as to be associated with a spot where the hidden object exists when viewed from the position of the first virtual camera in the first three-dimensional virtual space.

3. The non-transitory computer-readable medium according to claim 1,
wherein the video game is a video game in which at least one character object operates, in response to an operation of the user, within the first three-dimensional virtual space in which objects are arranged, and
wherein the target object indicated by the selection object is the target of the action of the character object when the video game proceeds.

4. The non-transitory computer-readable medium according to claim 1,
wherein the program product, when executed, further causes the user terminal to:
generate third output information regarding a map image, the map image indicating a bird's-eye image of the first three-dimensional virtual space; and
generate fourth output information regarding a second selection object, the second selection object indicating a position of the map image corresponding to the position of the target object in the first three-dimensional virtual space, the second selection object being configured to be selected, and
wherein, on the basis of the third output information and the fourth output information, the game image is output containing the map image in which the second selection object is displayed.

5. The non-transitory computer-readable medium according to claim 1,
wherein a player character object and a field object are arranged in the first three-dimensional virtual space, and
wherein the second three-dimensional virtual space is generated based on coordinate information of the selection object in the second three-dimensional space.

6. The non-transitory computer-readable medium according to claim 1,
wherein the program product, when executed, further causes the user terminal to:
obtain information regarding a conquest status of the target object, and
wherein the second output information is generated in which a form of the selection object is determined based on the conquest status.

7. The non-transitory computer-readable medium according to claim 1,
wherein the selection object indicates the target object of target objects that exist within an angle of view of the virtual camera, the target object being displayed on the output device.

8. The non-transitory computer-readable medium according to claim 1,
wherein the selection object is generated at the position of the hidden object by superimposing the second layer image on the first layer image.

9. The non-transitory computer-readable medium according to claim 1,
wherein the position of the first virtual camera in the first three-dimensional virtual space is equal to a position of the second virtual camera in the second three-dimensional virtual space.

10. The non-transitory computer-readable medium according to claim 1,
wherein the position and an angle of view of the first virtual camera arranged in the first three-dimensional virtual space are equal to a position and an angle of view of the second virtual camera in the second three-dimensional virtual space.

11. The non-transitory computer-readable medium according to claim 1,
wherein the program product, when executed, further causes the user terminal to:
generate third output information regarding a map image, the map image indicating a bird's-eye image of the first three-dimensional virtual space;
generate fourth output information regarding a second selection object, the second selection object indicating a position of the map image corresponding to the position of the target object in the first three-dimensional virtual space, the second selection object being configured to be selected;
generate a third layer image based on the third output information and the fourth output information; and
superimpose, on the first layer image and the second layer image, the third layer image.

12. The non-transitory computer-readable medium according to claim 1,
wherein the game image includes a plurality of selection objects displayed based on the second output information and the arrangement information.

13. A system for controlling progress of a video game, the video game proceeding in a first three-dimensional virtual space, a first virtual camera being arranged in the first three-dimensional virtual space, the system comprising:
a communication network;
a server; and
a user terminal connected to the server via the communication network,
wherein the server is configured to generate first output information based on information obtained by the first virtual camera,
wherein the server is configured to generate second output information regarding a selection object, the selection object indicating a target object, the selection object being configured to be selected, the target object being a target of an action when the video game proceeds,
wherein the server is configured to generate arrangement information regarding arrangement of the selection object indicating a hidden object based on a position of the first virtual camera and a position of the hidden object, the hidden object being the target object existing within an angle of view of the virtual camera and not displayed on an output device of the user terminal,
wherein the server is configured to transmit output information for outputting a game image based on the first output information, the second output information, and the arrangement information, the game image containing the selection object,
wherein the user terminal is configured to output the game image to the output device based on the output information, and
wherein the selection object indicates the position of the hidden object and is generated in the game image by superimposing a second layer image on a first layer image, the first layer image being generated based on the first output information obtained by photographing the first three-dimensional virtual space by the first virtual camera, the second layer image being generated based on the second output information and the arrangement information obtained by photographing a second three-dimensional virtual space by a second virtual camera.

14. A non-transitory computer-readable medium including a program product for causing a server and a user terminal to control progress of a video game, the video game proceeding in a first three-dimensional virtual space, a first virtual camera being arranged in the first three-dimensional virtual space,
  wherein the program product, when executed, causes the server to:
    generate first output information based on information obtained by the first virtual camera;
    generate second output information regarding a selection object, the selection object indicating a target object, the selection object being configured to be selected, the target object being a target of an action when the video game proceeds;
    generate arrangement information regarding arrangement of the selection object indicating a hidden object based on a position of the first virtual camera and a position of the hidden object, the hidden object being the target object existing within an angle of view of the first virtual camera and not displayed on a display screen of an output device of the user terminal; and
    transmit, to the user terminal, information for causing the output device to output a game image based on the first output information, the second output information, and the arrangement information, the game image containing the selection object,
  wherein the program product, when executed, causes the user terminal to:
    receive, from the server, information for outputting the game image on the display screen of the output device of the user terminal, and
  wherein the selection object indicates the position of the hidden object and is generated in the game image by superimposing a second layer image on a first layer image, the first layer image being generated based on the first output information obtained by photographing the first three-dimensional virtual space by the first virtual camera, the second layer image being generated based on the second output information and the arrangement information obtained by photographing a second three-dimensional virtual space by a second virtual camera.

* * * * *